(12) United States Patent
See

(10) Patent No.: US 9,387,619 B2
(45) Date of Patent: Jul. 12, 2016

(54) PLASTICS PROCESSING METHOD AND APPARATUS

(75) Inventor: Michael D. See, Broadview Heights, OH (US)

(73) Assignee: COLORMATRIX HOLDINGS, INC., Wilmington, DE (US)

(*) Notice: Subject to any disclaimer, the term of this patent is extended or adjusted under 35 U.S.C. 154(b) by 527 days.

(21) Appl. No.: 13/178,661

(22) Filed: Jul. 8, 2011

(65) Prior Publication Data

US 2012/0007265 A1    Jan. 12, 2012

Related U.S. Application Data

(60) Provisional application No. 61/362,410, filed on Jul. 8, 2010.

(51) Int. Cl.
*B29C 47/08* (2006.01)
*B29C 47/10* (2006.01)
*B29C 47/54* (2006.01)
*B29C 47/92* (2006.01)
(Continued)

(52) U.S. Cl.
CPC .......... *B29C 47/0811* (2013.01); *B29C 47/109* (2013.01); *B29C 47/1063* (2013.01); *B29C 47/364* (2013.01); *B29C 47/38* (2013.01); *B29C 47/54* (2013.01); *B29C 47/92* (2013.01); *B29C 47/0009* (2013.01); *B29C 47/1027* (2013.01); *B29C 47/366* (2013.01); *B29C 47/367* (2013.01); *B29C 2947/92019* (2013.01); *B29C 2947/9238* (2013.01); *B29C 2947/92371* (2013.01); *B29C 2947/92657* (2013.01); *B29C 2947/92866* (2013.01); *B29K 2105/0005* (2013.01)

(58) Field of Classification Search
CPC ........................ B29C 47/1081; B29C 47/92
USPC ..................... 264/40.3, 40.7, 176.1, 211
See application file for complete search history.

(56) References Cited

U.S. PATENT DOCUMENTS 5,559,173 A * 9/1996 Campo et al. .................. 523/303
5,799,688 A * 9/1998 Yie .......................... 137/505.13
(Continued)

FOREIGN PATENT DOCUMENTS

JP          6 246814       9/1994
JP          2009-279754    3/2009
WO       WO 2005/102665   11/2005

OTHER PUBLICATIONS

International Search Report from PCT/IB2011/001599.
(Continued)

*Primary Examiner* — Christina Johnson
*Assistant Examiner* — Xue Liu
(74) *Attorney, Agent, or Firm* — Fay Sharpe LLP

(57) ABSTRACT

A method for additive delivery during a plastics processing is disclosed. The method includes establishing a network of components in a control loop that uses a feedback method to drive at least one pump, thus enabling continuous, robust proportioning of additive in a difficult to control environment. The feedback method includes sending at least one signal from at least one sensor associated with a plastics melting machine to a controller, sending one or more signals from the controller to the at least one pump, monitoring the pressure in the at least one pump and sensing the position of an injection nozzle valve, and sending one or more signals to the injection nozzle valve instructing the valve to open or close.

20 Claims, 7 Drawing Sheets

(51) Int. Cl.
*B29C 47/38* (2006.01)
*B29C 47/00* (2006.01)
*B29K 105/00* (2006.01)
*B29C 47/36* (2006.01)

(56) References Cited

U.S. PATENT DOCUMENTS

| 6,332,767 | B1 * | 12/2001 | Kudert et al. ............... 425/130 |
| 6,669,358 | B2 | 12/2003 | Shimoda |
| 6,866,171 | B2 | 3/2005 | Ickinger |
| 2004/0206246 | A1 | 10/2004 | Bortone |
| 2004/0262813 | A1 | 12/2004 | Pierick |
| 2005/0154155 | A1 | 7/2005 | Battiste |
| 2007/0256631 | A1 * | 11/2007 | Lintner et al. ............... 118/24 |
| 2008/0302986 | A1 * | 12/2008 | Leahy et al. ............. 251/129.01 |
| 2010/0140288 | A1 * | 6/2010 | Jones et al. ............... 222/1 |

OTHER PUBLICATIONS

Japanese Office Action dated Mar. 24, 2015 (which cites the patent documents), 5 pages.

Translation of Japanese Office Action dated Mar. 24, 2015 (which cites the patent documents), 7 pages.

* cited by examiner

PLASTICS PROCESSING METHOD AND APPARATUS

This application claims the benefit of U.S. Provisional Application No. 61/362,410 filed Jul. 8, 2010, the disclosure of which is herein incorporated by reference.

BACKGROUND

The present exemplary embodiment relates to additives/colorants plastics processing, for example an extrusion method and apparatus. It finds particular application in conjunction with a method and apparatus for providing a proportional addition of additive into material during plastics processing, for example the extrusion process, and will be described with particular reference thereto. Applicable extrusion processes include but are not limited to sheet, film and fiber. However, it is to be appreciated that the present exemplary embodiment is also amenable to other plastic applications and processes. For example, it may be applied to situations wherein additives are introduced to molten polymer which comes directly from a reactor, for example a reactor in which melt polymerization is undertaken and/or wherein there is no extruder into which polymer pellets would conventionally be fed.

The plastics melting process uses one or more screws to force plastic beads into a barrel of an extruder heated to the desired melt temperature. The plastic beads melt gradually as they pass through the barrel. The plastics melting process is highly dependent on a consistent feed of bulk materials into the feed throat to maintain consistent output. Consistent output is necessary for consistent finished product properties such as size, strength and appearance. The properties of the finished product are determined by the base materials, fillers, and additives including colorants that are blended before and during the melt phase of the process. Additives such as pigments, dyes, flame retardants and antimicrobial agents are often added to extrusion and injection molding processes to modify the physical and chemical properties of materials making the material more desirable. All plastics melting processes have various means of control which lead to longer or shorter feedback loops to the feeding equipment to manage and maintain correct proportional output.

Bulk materials in the forms of powders, granules, pellets, irregular chunks, and irregular flakes are produced from various processes that are conveyed to the extruder or injection molding machine. These materials are typically blended and held in a hopper or material line of various sizes before being conveyed to the feed throat of the machine. Typically these materials reed into the process by gravity to the screw which, in this section of the extruder, acts as a conveyor to sections of the process where heat and pressure are applied to melt and mix the materials. In those cases where the material does not feed consistently by gravity, especially where flakes or irregular shapes are present, mechanical means such as crammer feeders, or stuffers are used in an attempt to manage consistent feeding of materials.

Dry powder, pellet and liquid forms of additives may be added to the stream of bulk materials before the introduction to the screw. The material feeders in this case are auger feeders, disk or wheel feeders, belts, vibratory feeders, simple timers and pumps in the case of liquid additives. By adding these materials to the material stream before introduction to the screw, an amount of material is created which may have had correct proportion upon delivery, but is committed to the process regardless of the proportion of the material produced upon output of the process.

Another method for introducing additives into a material is to inject liquid additive directly into the barrel of the apparatus. However the start up protocol involved with this method is complex and recovery from problems that arise is extremely difficult. Moreover, the amount of scrap produced in this method is greatly increased as a result of the foregoing issues.

The final form of the material processed by the one or more screws is a viscous liquid melt which will be further processed by the machine to produce the final shape or form. This final shape ranges from the manufacture of fibers, strands and extruded shapes, to injection molded products of various forms. A large amount of material, time and energy is committed to the process to produce this melt. A natural efficiency exists when valuable additives are added to the process at the last possible moment while maintaining the potential to thoroughly mix, disperse, or saturate the polymer stream with the additive in precise proportions to the materials and in correct proportion to the output of the process.

Moreover, developing feed stocks of consistent sizes, shapes, melt index, density and color is becoming more difficult for manufacturers as raw materials become more expensive and feed stocks become more valuable in a world of higher and higher value of oil products. The requirement for material property modifiers further complicates the sourcing and most frequently adds substantial cost to the materials already in short supply. The introduction of additives and more importantly the ability to deliver liquid additives into the process is preferred to using higher specification materials where they are not needed. Liquid additives allow the choice of inclusion and proportion at the process, to minimize cost. The material input into the process is now the result of the requirements of the finished product rather than the availability of higher specified materials, which significantly reduces cost. Liquid additive injection further allows very short control loops to the output of the process since liquids may be pumped at elevated temperatures and pressures.

Inconsistent feeding of hulk materials has also led to inconsistencies and inefficiencies in the process, changing the size of the extruded product and its variable physical and appearance properties. Introduction at the latest point of the process assures correct proportion relative to process conditions (elevated pressures and temperatures) that a solid feeder cannot. Further sophisticated pumping systems allow the amount of in process mixed material to be very small, leading to less material involved in color changes and more rapid reaction to changes in the process in real time. As process outputs change, the introduction of the additive changes proportionally nearly simultaneously, thus preventing problems with over dosing or under dosing of additive.

The following references, the disclosures of which are incorporated herein by reference in their entireties, variously relate to colored plastics molding devices and systems. U.S. Pat. No. 5,486,327 teaches of an arrangement for introducing a liquid additive to the barrel of a screw-type mechanism for converting solid material to molten material. However, this method introduces the additive close to the feed throat, thus leading to inconsistent input variables with regrind and density variation associated with less expensive raw materials.

U.S. Pat. No. 5,439,623 provides a method for controlling the introduction of additives, in the form of a plurality of strands, to a cutter. The method uses the feed rate, velocity and delta position for each strand per feed interval in order to obtain the desired amount of additive. However, this method does not use a control logic method to proportionately inject additive according to the output of the extruder.

Thus, there is a need for an additive introduction method that provides consistent, proportional additive into the plastics melting process, while reducing cost and increasing efficiency.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

SUMMARY OF THE INVENTION

Embodiments are disclosed herein as illustrative examples. In one embodiment, a method for additive delivery during plastics processing, for example during a plastics melting process is disclosed. The method includes establishing a network of components in a control loop that uses a feedback method to drive at least one pump. The feedback method includes sending at least one signal from at least one sensor associated with a plastics processing device, for example a plastics melting machine to a controller, sending one or more signals from the controller to the at least one pump, monitoring the pressure in the at least one pump and sensing the position of an injection nozzle valve, and sending one or more signals to the injection nozzle valve instructing the valve to open or close.

In another embodiment, a method for maintaining proportional additive delivery into a plastics processing device, for example into a melting machine is disclosed. The method includes establishing a proportion based on amperage of a melting machine and the revolutions per minute (RPM) of an associated pump, programming zones with various step-wise slopes delineated by specific conditions within the melting machine, and programming the delivery of an additive to the melting machine based on the corresponding zone to maintain proportional additive delivery.

In yet another embodiment, an additive delivery system is disclosed for the accurate introduction of an additive in plastics processing, for example for introduction into a plastic melting process. The system includes at least one sensor associated with a plastics processing device, for example a melting apparatus, a high pressure nozzle controller, at least one pump, and a high pressure nozzle. The system comprises a logic based control loop that uses a feedback logic method to drive the at least one pump and injection nozzle valve.

In a further embodiment, a high pressure injection nozzle is disclosed for downstream additive delivery in plastics processing, for example in plastics melting processes. The nozzle includes a land having a length between about 3 inches and 5 inches to facilitate downstream injection in a mixed melt/solids environment, a dual seal system including an outer seal and an inner seal, high pressure tubing, and a cooling mechanism to protect the nozzle from heat build-up. Alternatively, the nozzle may include a short land version for melt injection used both in the metering section and in the post extruder screw before static or dynamic mixture.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

The present invention comprises an additive delivery system for the proportional administration of a liquid additive into the plastics melting process. The method employs a short control loop system with controllers that provide instruction and feedback signals to promulgate and manage the system. The additive delivery system is user-specific; therefore, it may be custom programmed to meet particular demands. While the system is herein described and illustrated in conjunction with a plastication extruder, it should be understood that the invention is applicable to other types of apparatus for melting and discharging materials.

Figure 1:
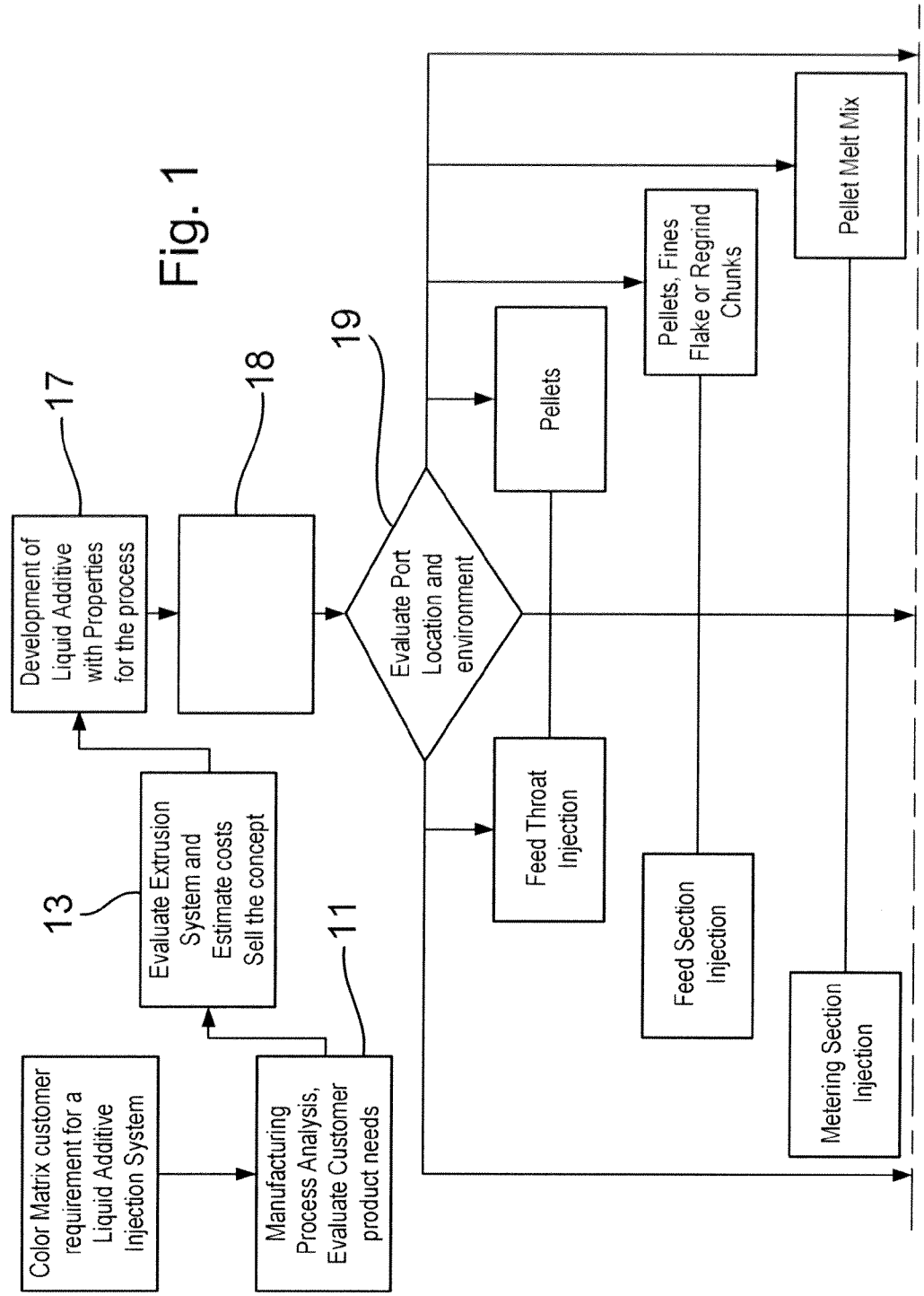
FIG. 1 is a schematic representation of the additive injection system's customization model.
Figure 1:
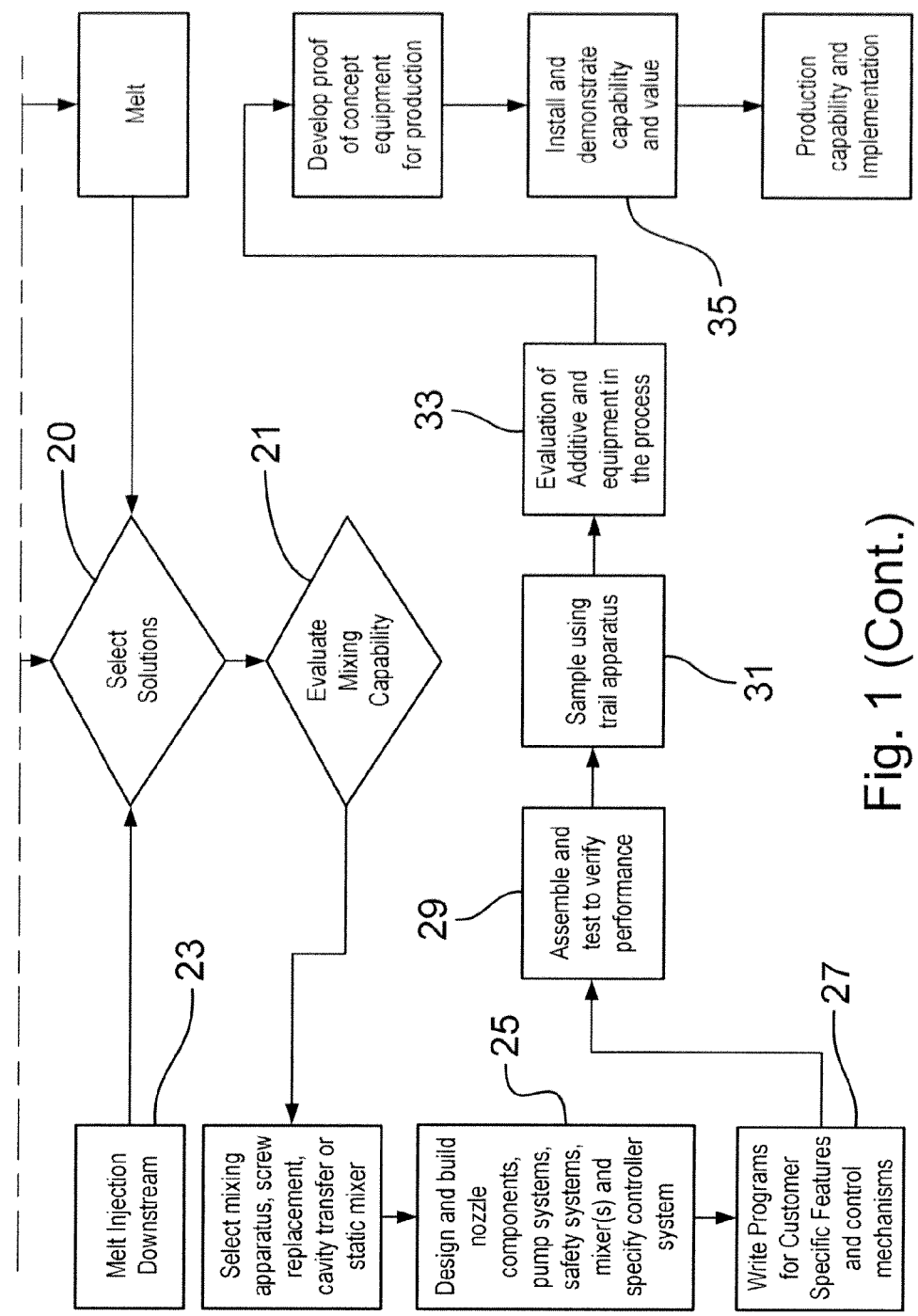

Referring now to the drawings wherein the showings are for purposes of illustrating the exemplary embodiments only and not for purposes of limiting the claimed subject matter, FIG. 1 represents a model for assessing consumer requirements to properly customize an additive delivery system to reach its highest and preferred functionality. In one embodiment, once a consumer identities a need for a liquid additive injection system, the first step requires an evaluation of a user's product needs 11 by performing a manufacturing process analysis. The customer's or manufacturer's current extrusion system is evaluated and costs are estimated 13. A liquid additive is developed 15 with consumer-desired properties and potential injection port locations and environments are evaluated 17. During this process different materials are used depending on the location of injection. For example, if injection is to occur in the feed throat, the additive is added in the presence of pellets, flakes, regrind chunks and fines, if injection is to occur at the feed section, the additive would be injected in the presence of pellets, fines, flakes or regrind chunks and a thin melt film; and if injection was to occur in the metering section, the additive would be injected in the presence of melt. It is noted that if injection occurs downstream of the mixing screw, it may be desirable to employ a cavity transfer mixer (CTM). As is known by the skilled artisan, the CTM comprises a closely fitted rotor and stator, both of which are covered in staggered rows of hemispherical cavities to create a continuous helical path in which fluid elements undergo a series of cutting, folding and turning deformations. This can improve mixing of low viscosity fluids into large volumes of higher viscosity fluids. Once the location of the injection location is determined 19, a solution can be selected

20. The ability for the additive to mix with the solution is tested and evaluated 21. The nozzle components, safety systems, mixer systems, and controller systems may then be designed and built 25. Customized programs and control mechanisms are developed 27 with the precise features determined from a user's particular demand. Once the additive delivery system is assembled and tested 29, a potential purchaser may sample the system using the apparatus as a trial 31, so that the customer may evaluate the additive and the equipment in the process 33. Providing the customer determines the trial(s) are satisfactory, the system may be installed at the customer's desired location 35.

In the alternative, the system may be programmed with default settings if a consumer does not require customized features, or the customer may select desired preprogrammed features from a features menu. The featured menu comprises set of screens that present questions to a user to set forth what components are at ached to the machine. For example, if a consumer does not have both a dosing pump and a pre-charge pump, the pre-charge pump not included in the system would be de-selected. This programming step may also be done automatically via a PLC that looks for attached components and can sense what is attached.

Figure 2:
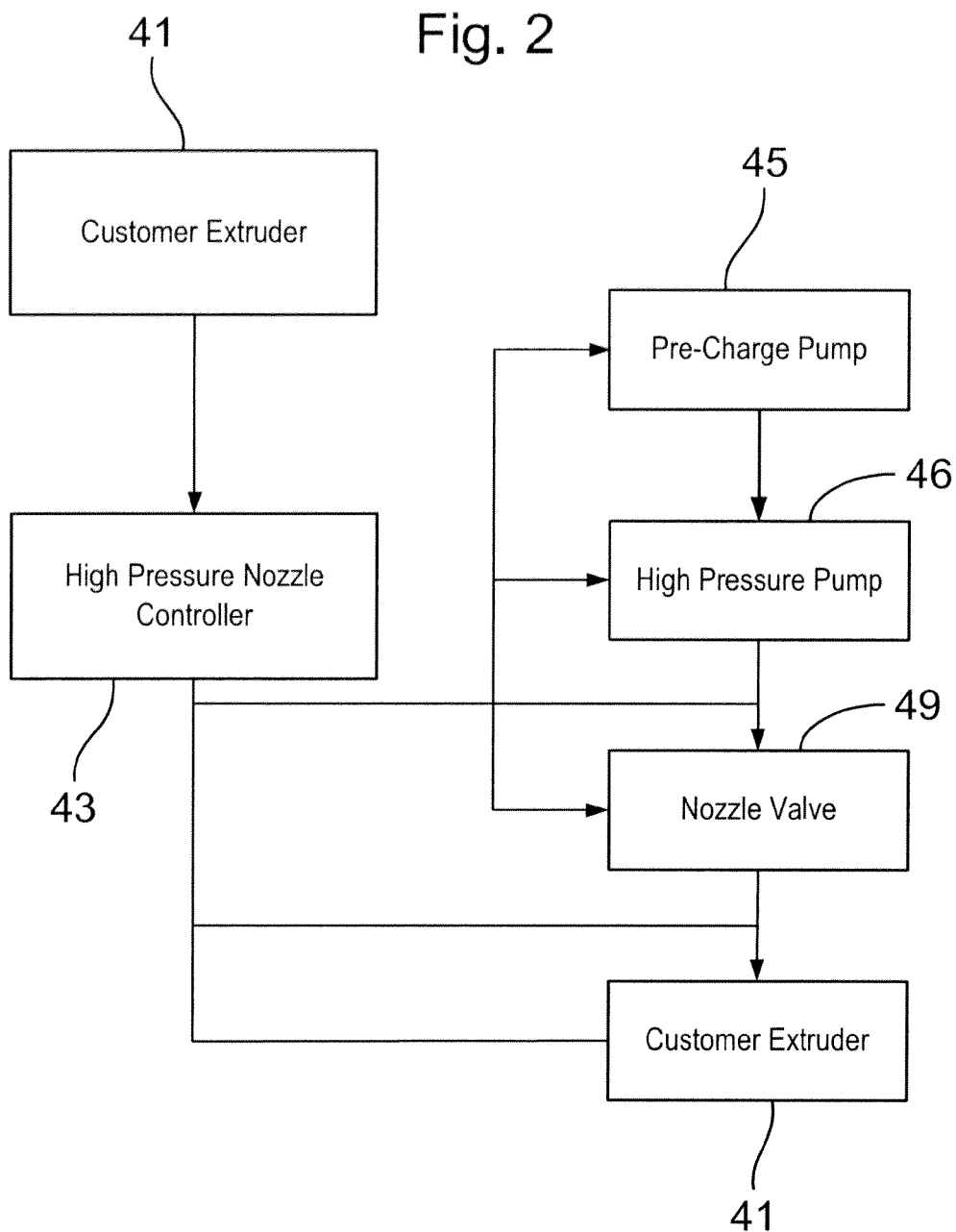
FIG. 2 is a schematic representation of a method for using the additive injection system with a user's current extruder.

FIG. 2 represents a preferred embodiment of the additive delivery system to be implemented with a user's current extruder 41. The system comprises one or more pumps 45, 46, sensors and controllers 43 creating various control loops. Sensors on the extruder 41 provide feedback to a high pressure nozzle controller 43, which in turn outputs signals that may activate the system, stop the system and/or alter the output of the system up and down. Generally, the high pressure nozzle controller 43 determines at what point the nozzle valve 49 opens and closes, thus maintaining proper and proportional additive delivery into the melt of an extruder.

Figure 3:
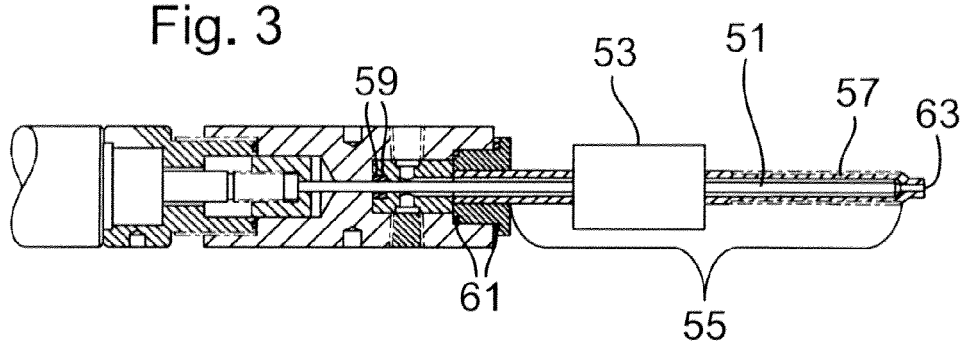
FIG. 3 is a cross-sectional diagram of a high pressure injection nozzle.

Preferably, an exemplary embodiment of the additive delivery system includes a high pressure injection nozzle adapted for additive delivery downstream on an extruder barrel. FIG. 3 displays one embodiment of the high pressure injection nozzle that may be used for the proportional injection of liquid additives. The high pressure injection nozzle differs from traditional nozzles in that it is capable of injection downstream on an extruder barrel, away from the feed throat. An injection site downstream from a feed throat is preferable, since it facilitates holding off the addition of additives to the last possible moment during extrusion, while still allowing adequate time for through mixing, thus ensuring the additive is delivered in precise proportions to the output. When additives are mixed with the bulk materials before introduction of the screw, a proportion that was once accurate upon introduction, may be inaccurate in the end due to pressure variances changing the rate and quantity of the output. Further, downstream injection directly into the barrel allows for addition of materials that are chemically sensitive to the atmosphere. Preferably, the injection site is more than about 2 flights downstream of the feed throat and even more preferably more than about 3 flights downstream from the feed throat. Typically, additive injection occurs upstream, close to or inside the feed throat. For such injections, typically non-valved injection nozzles are used. When injecting into the feed section of the screw, the high pressure injection nozzle of the present invention preferably includes a land length of between about 3 in. and 5 in., more preferably between about 3.5 in. and 4.5 in; and most preferably about 4 in. The land length may be critical, particularly because of the increased pressure when injecting downstream, directly in the melt, compared to upstream closer to the feed throat. The high pressure nozzle according to the present invention has a hardened nozzle tip made out of hard tool steel, such as D-2, and a hardened nozzle valve pin. Additionally, the nozzle preferably includes a linear position indicator that is capable of sensing the injection nozzle valve position.

The high pressure injection nozzle is capable of high pressure intensification. Preferably, the high pressure injection nozzle comprises an approximately 2 in. cylinder 51 and high pressure steel tubing 57. The high pressure tubing may be between 4,000 and 7,000 psi tubing. More preferably, however, the high pressure tubing is about 5,000 psi tubing. This pressure intensification ability allows generation of thousands of pounds per square inch (psi). Preferably, the nozzle will generate between 8,000 to 12,000 psi of pressure. In another embodiment, the nozzle will generate 10,000 psi.

The high pressure injection nozzle further preferably comprises a seal system including dual seals 59 and a combination of at least one O-ring 61 and quad seals to better combat the leaking problem typical nozzles experience. The additive flows into the nozzle through openings located on the sides of the nozzle, through the high pressure tubing 57 and out of the nozzle. The presence of the seal system eliminates the amount of additive leakage. The high pressure injection nozzle may further include a cooling block 53 to manage the temperature of the nozzle 63. The nozzle will build up a great amount of heat due to the close proximity of barrel heater bands and must be cooled to protect the nozzle from any damage. Additionally, with excessive heat build-up, operation of the air cylinder may become erratic and the seals may stop operating properly. In one embodiment, a cooling block 53 may be placed around the barrel of the nozzle. The cooling block 51 is temperature conditioned by running various temperatures of water through the block. In another embodiment, the nozzle may be wrapped with a chilled copper coil to keep the temperature of the nozzle down. In yet another embodiment, heat shields are used that comprise an insulated wrap that can be bent to shape foam or a fabric insulator. Fans may also be implemented to blow across a nozzle to cause further cooling.

Preferably, the injection high pressure nozzle controller is a programmable logic controller (PLC), wherein a user may input customized values and settings. As is known in the art, a PLC is a programmable computer used for automation of real-world processes, designated for multiple input and output arrangements in real-time, to produce responses to input conditions within a hounded time. PLC is a microprocessor-based device with either modular or integral input/output circuitry that monitors the status of field connected sensor inputs and controls the attached output "actuators" (motor starters, solenoids, pilot lights/displays, speed drives, valves, etc.) according to a user-created logic program stored in the microprocessor's battery-backed RAM memory. PLC programs are generally written in a special application on a personal computer and then downloaded over a custom cable to the PLC. The program is typically stored in the PLC either in battery-hacked-up RAM or some other non-volatile memory.

A PLC differs from a dedicated device in that it is able to be programmed to a user's specifics and interface with a network similar to a phone or computer. PLCs allow one to drive more numerous relays into a small package allowing more logic for better control of a system. The high pressure nozzle controller preferably includes logic for multiple analog control loops. Further, the high pressure nozzle controller may also comprise a human machine interface (HMI), such as a keypad or PC-type workstation, to provide a communication link to coordinate the various subsystems.

A feature of the PLC is the ability to adjust an analog output based upon an analog input. In one embodiment, the high pressure nozzle controller monitors analog signals including: pressure experienced by one pump feeding another pump; pressure downstream from a pump and before a nozzle valve; pressure from melt at the barrel head of an extruder; and the output from an extruder. The output from an extruder is typically monitored according to the RPM of the screw or amperage of the screw drive motor.

Figure 4:
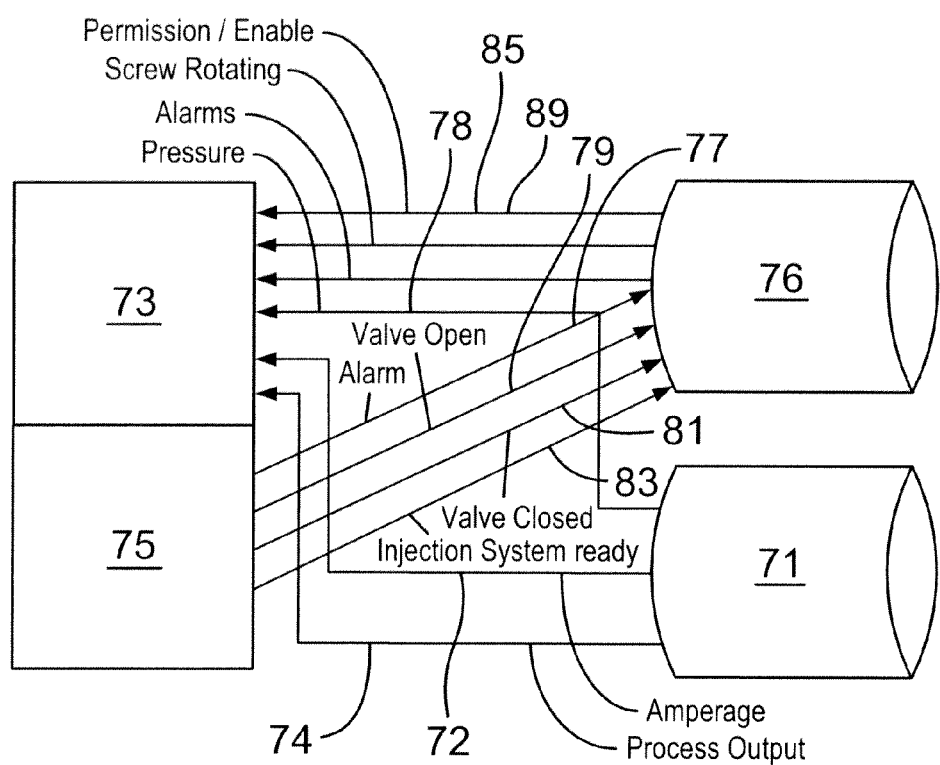
FIG. 4 represents an example of inputs and outputs from the high pressure nozzle controller.

FIG. 4 displays an example of inputs and outputs for one embodiment of the high pressure nozzle controller. The extruder 71 reports amperage 72 and other process outputs 74 to the nozzle controller 73 which in turn outputs 75 one or more of numerous possible signals. As an example of an exemplary embodiment, the controller may signal an alarm 77, it may open or close the nozzle valve 79, 81, and/or it may relay that the injection system is ready 83. The nozzle controller 73 may also monitor inputs from the extruder 71 such as whether the system is enabled 85 and if the screw is rotating 87.

Many practitioners of this art rely upon RPM of the extruder as their primary indicator of output of the extruder. Simplified processes presume a constant output per revolution of the extruder. This is typically most precise in systems that are not optimized for maximum output or are 'under capacity'. As capacity limits are approached, the correlation between RPM and output changes. Therefore, the additive delivery system of an exemplary embodiment is primarily a pressure feedback system, wherein pressure sensors monitor the pressure at the output of an extruder to regulate additive input. However, pressure alone is still generally not a sufficient measure because it may lead to disproportionate results. Therefore it is preferable to implement a method for maintaining a proportionality of additive input and extruder output by including amperage measurements.

Motor amperage is generally the most direct correlated indicator of output from the process. Theoretically, as systems become optimized, a mathematical model may be derived to correlate the output of the additive delivery system to the output of the extruder. However, overly simplified algorithms will not allow compensation for compounded variation in inputs. The present embodiment employs three zones, consisting of the approach to the optimum zone, a limited range below the optimum zone, and a range above the optimum zone. Arguably, however, an infinite number of zones could be identified for this purpose.

To implement an amperage measurement system for maintaining a proportionality of additive input and extruder output, the additive delivery system may include amperage tracking devices connected to the extruder to provide current feedback from the extruder to the high pressure nozzle controller. Preferably, the system comprises a high pressure dosing pump and high pressure line/valve transducer, which employ a method for tracking the output of an extruder to ensure additive delivery remains in proportion to the output. As is known in the art, a dosing pump is a low-volume pump with controllable discharge rates. The high pressure dosing pump is preferably capable of withstanding pressure of approximately 3000 psi. The system can accommodate various types of pumps including piston, gear and progressing cavity, and may include more than one pump. The system may further include a pre-charge pump connected in series with the high pressure dosing pump to double the system's pressure capacity. The pre-charge pump also preferably carries pressure capacity of about 3000 psi; therefore, the pumps together could have the capacity of enduring pressure of at least 6000 psi. It is further possible to stack multiple, lower pressure pumps in series to increases the overall pressure capacity. For example, three 1000 psi dosing pumps can be stacked in series with a 3000 psi pre-charge pump, also resulting in a total capacity of 6000 psi. When a pre-charge pump is implemented, a pressure transducer is placed downstream of the pre-charged pump to sense the pressure in the pre-charge pump. The high pressure pump will not start until the pre-charge pump reaches its pressure setting. The double stacked pump assembly (dosing pump and pre-charge pump) is important because it will maintain a consistent head pressure on the second (dosing) pump, which is directly related to maintaining a consistent output.

Figure 5:
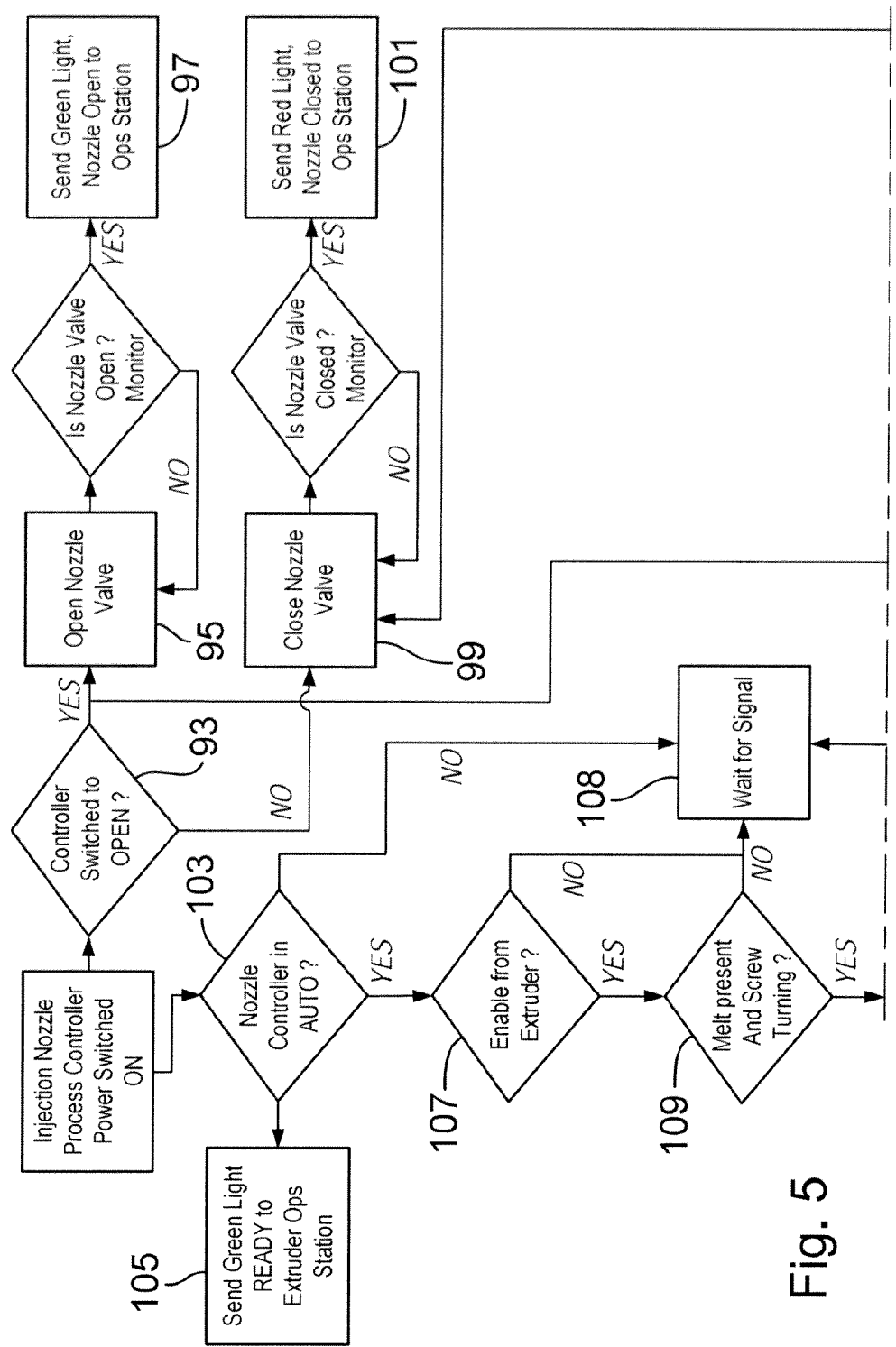
FIG. 5 is a schematic representation of the control logic additive injection system.
Figure 5:
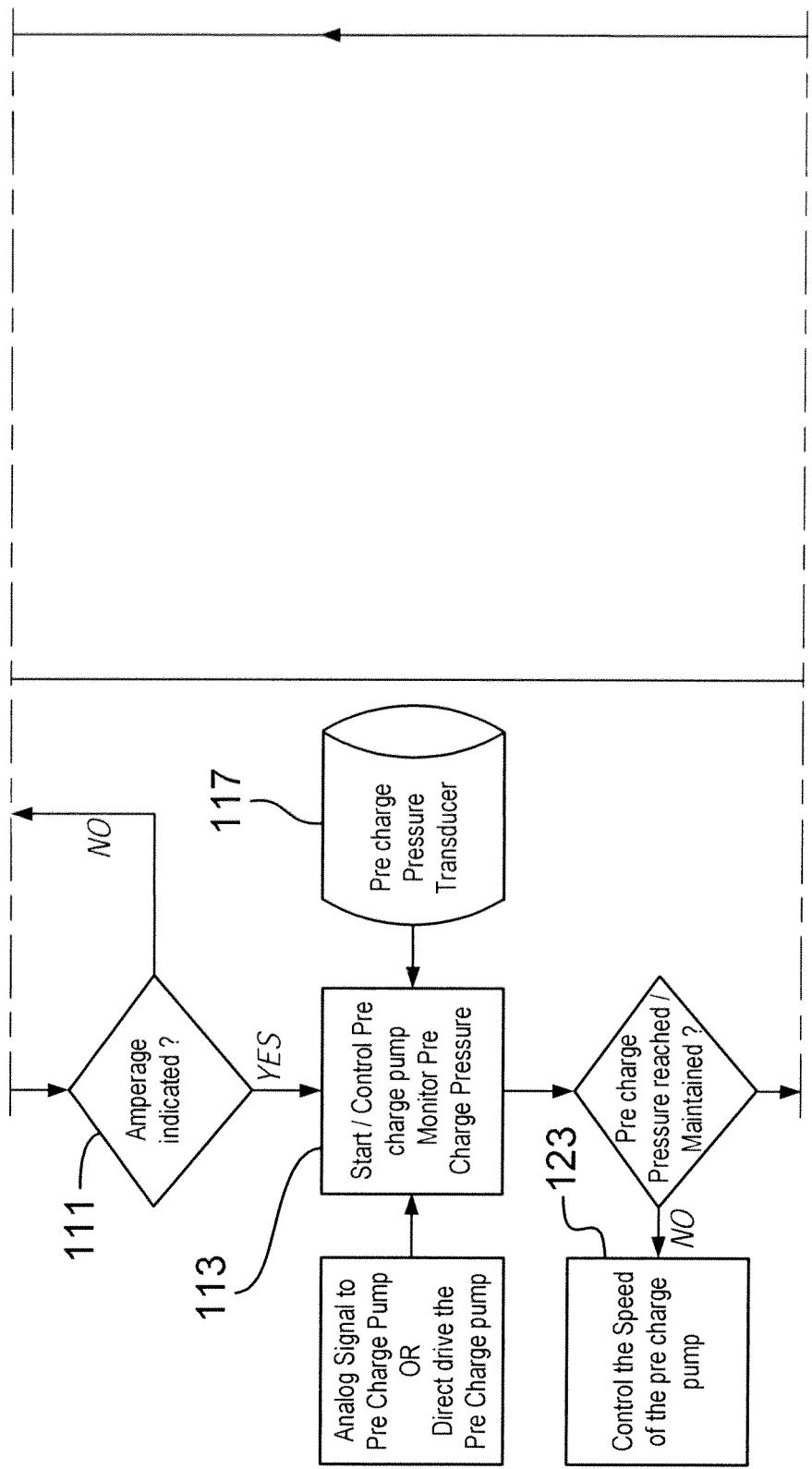
Figure 5:
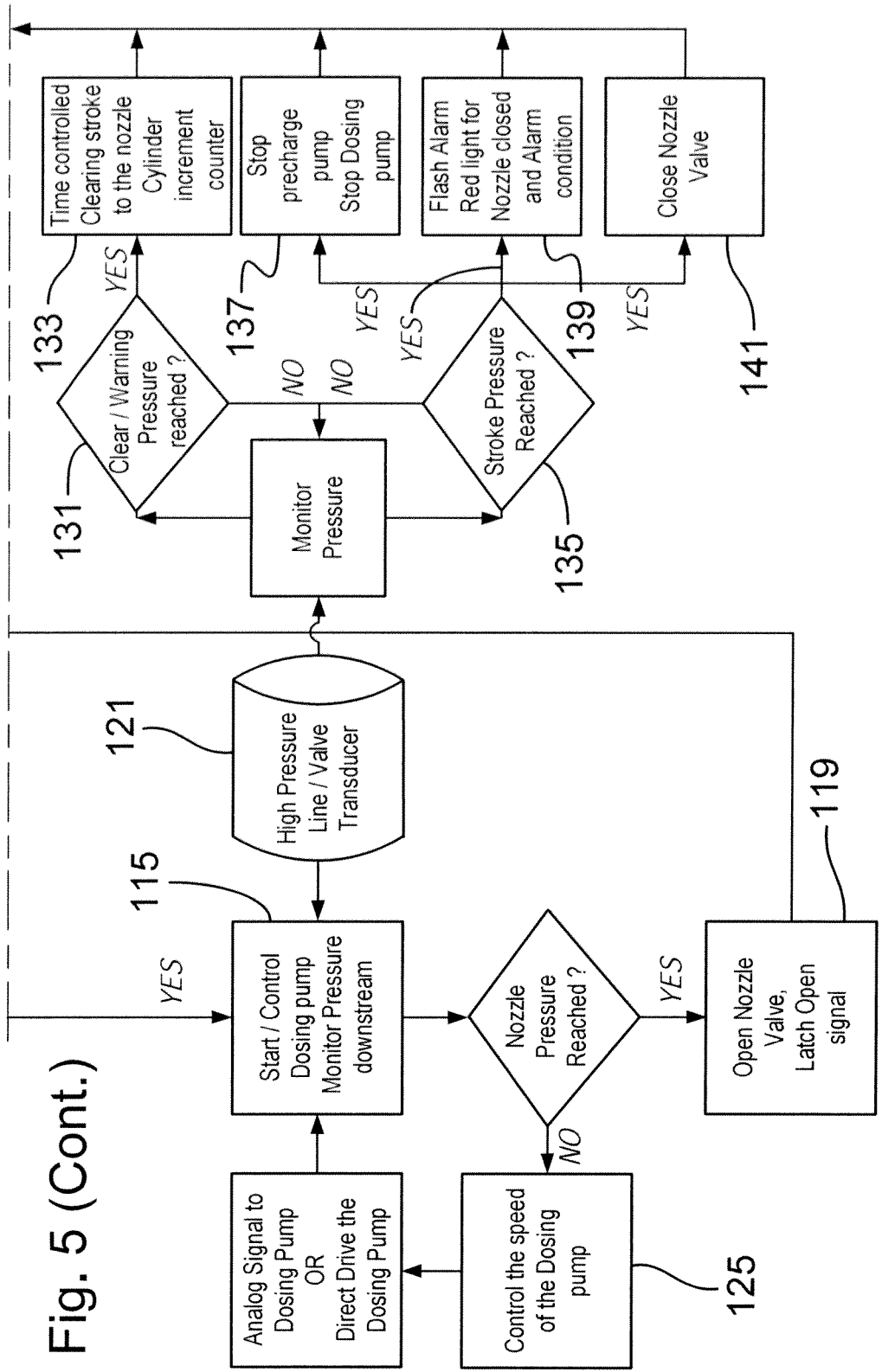

The high pressure nozzle controller is generally a logic/sequence controller with the means of receiving various analog signals, which then drive the high pressure dosing pump and/or the pre-charge pump, if included, by either analog signals or direct drive. FIG. 5 represents a preferred embodiment of the control logic additive injection system. Once the injection nozzle controller is powered ON 91, the controller may be manually switched to OPEN 93, READY, or any other indication indicator. Upon being switched to the OPEN command 93, the nozzle valve will automatically open 95 allowing additive to flow into the extruder barrel. This will send an alert, such as a light, textual message, etc. to the extruder operation station 97, indicating that the process has begun. If the controller is not switched to open, the nozzle valve will close 99 and a signal will be sent to the operation station that the nozzle is closed and an alert indicating the nozzle closure will result 101.

The high pressure nozzle controller may also be set to AUTO 103, which automatically sends a green 'READY' light to the extruder operation station 105 when the controller is turned on. Alternatively, the controller must receive three signals prior to triggering the green 'READY' light. The first signal designates that the system is enabled and authorizes action to begin 107. The second signal includes two indicators, a permission indicator and a screw indicator 109. The permission indicator reveals whether the extruder is operational and the proper material is present in the system and the screw indicator acknowledges whether the screw is turning. Both the permission indicator and screw indicator are necessary to trigger the second signal. The third signal is amperage signal 111 that indicates the current or flow rate of the material exiting the extruder. The high pressure nozzle controller fails to receive any of the three necessary signals, the nozzle controller will not activate the green 'READY' light, will wait until such signal is received 108.

Upon receipt of each of the three signals, the high pressure nozzle controller sends the green light to the extruder operation station, which initiates activation of either the pre-charge pump 113 or the high pressure dosing pump 115, depending on the system configuration and pressure. The high pressure nozzle controller will receive signals from a pressure sensor upstream and downstream of the nozzle, which will in turn instruct the either high pressure or pre-charged pump to begin pumping the additive through to a high pressure injection nozzle. The high pressure dosing pump is slaved to the output of the extruder and driven to match the output and maintain the pressure of the extruder.

In one preferred embodiment, the system includes both a pre-charge pump and a high pressure dosing pump attached in series. Additional systems may further monitor the presence or absence of adequate liquid product in the supply system. Such systems will signal an alert if the reservoir is low and the pre-charge pump will not initiate. Upon receiving the three mandatory signals 107, 109, 111 and a signal that there is adequate liquid product in the supply system, the high pressure nozzle controller will initiate the pre-charge pump and monitor its changing pressure 113. If the pre-charge pump fails to reach a predetermined pressure, the pre-charge pressure transducer 117 will provide an input signal (analog or digital) to the high pressure injection nozzle controller. The high pressure injection nozzle controller will, in accord with the programmed algorithm, increase or decrease pre-charge pump speeds to maintain the desired pre-charge pressure in the inlet to the dosing pump (123). Upon reaching the designated pressure while maintaining an adequate liquid product level, the high pressure nozzle controller will signal to the high pressure dosing pump to begin and the controller will monitor the pump pressure 115. Upon reaching a designated nozzle pressure, the nozzle will open releasing additive into the extruder 119. If such pressure is not achieved, the high pressure line/valve transducer 121 will speed up the high pressure dosing pump 125 until such pressure is attained.

The high pressure nozzle controller will insure that the pressure of the additive is higher than the pressure of the melt before it will instruct the valve to open. The high pressure nozzle controller maintains the pressure relationship by controlling the revolutions per minute (RPM) of the pumps while monitoring the amperage of the extruder. To establish this relationship, the system should be calibrated as part of the set-up conditions to tell the controller what the output per revolution per minute is supposed to be. Then the amperage input is correlated with the output to establish the system settings. Such calibration is typically done through manual calibration; however, it may also be performed automatically.

The high pressure injection nozzle controller monitors the extruder pressure and assures that the pressure in the nozzle valve is greater than the pressure of the melt in the extruder. This process occurs in three distinct steps. First the extruder sends the permission signal to the controller signaling that the extruder is operational. The controller then operates the pump to build pressure in the system. Once the pressure reaches and exceeds the threshold, the melt pressure valve will open. The pressure will then be maintained by the RPM of the high pressure pump. As the extruder slows down, amps will decline which will reduce the output (RPM) from the high pressure dosing pump until they stabilize at the set values. Each extruder is different; therefore, safe minimum operating pressures will need to be determined for each application.

As process input materials vary due to both normal and abnormal causes such as variation in density or shape, the output of the extruder may change. Proportioning the output of the extruder to the liquid output delivered to the process led to the development of programmable zones with various slopes for more precise proportioning of the additive to the polymer. These zones are delineated by specific conditions within the extruder and are a combination of the inputs for liquid and melt pressure, RPM and amperage in the extruder drive motor. For example, as the extruder RPM remains stable, and melt pressure and amps slope downward, a specific decrease in pumping rate of the additive may be programmed proportional to the change to ensure correct proportion and prevent cascading of out of proportion conditions.

As shown in FIG. 5, if the nozzle pressure reaches a designated clear-warning level 131, the high pressure injection nozzle controller will induce a clearing stroke to relieve a clog in the nozzle 133. The high pressure injection nozzle controller will initiate as many clearing strokes as is necessary to clear any impediment. If the nozzle pressure reached a designated spike pressure 135, the high pressure injection nozzle controller will stop the pre-charge and/or dosing pumps 137, activate a red alarm light indicating a closed nozzle 139, and close the nozzle valve 141.

Once the high pressure injection nozzle controller receives a signal indicating the pressure has reached a suitable level, such as 120 psi, it signals the high pressure injection nozzle to open and latch, allowing additive to flow into the barrel of an extruder. The pressure of the system may experience pressure fluctuations up and down; however, the high pressure injection nozzle will not re-latch and close unless the pressure rises and falls a set number of times, wherein an associated alarm will be triggered. However, a rapid change in pressure indicates that there may be a problem in the system, such as a frozen or clogged nozzle, etc. As such, a rapid change in pressure can trigger closing of the high pressure injection nozzle. It is an aspect of the present invention that when such a problem occurs, the extruder is not stopped and shut down. Shutting off the system entirely would waste significant tithe and expense. Instead, necessary cleaning or other work may be accomplished while the system is still in use, to ensure the proper proportions remain intact.

The additive injection system preferably includes an alarm system with multiple alert conditions to indicate to a user when certain situations occur. Preferably, alert conditions include, but are not limited to, a nozzle alert to indicate that the valve of the high pressure injection nozzle has either not closed entirely or that the nozzle is clogged; a pressure alarm sensing the pressure in the system; a power alert; and a material alert indicating that there is ample material present in the system. The alarm system preferably includes visual, electrical and audio alarms. Visual alarms may include various light colors, each indicating a different condition. For example, a green light may indicate the system is powered and ready to begin. A red light may indicate that the system is down. Flashing lights may indicate a clog in the nozzle and an amber light may indicate that there is ample material in the system. The lights may be stacked and mounted to the base of a controller or operator station, or in a place designated by a user. Another form of alert is an audio alert. The audio alert may include various sounds to indicate different system conditions. Further, an alert may be electrical, causing the system to close until a condition is assessed. This is particularly important during a nozzle clog or a drastic pressure change.

Although the specific embodiments focus on plastics processing which uses an extruder, the method and apparatus described may be applied where an extruder is not used to melt polymer, but additive is introduced into molten plastics which comes directly from a polymerization reactor, for example in which melt polymerization is undertaken. Additives may be introduced downstream of the reactor using the method and apparatus described mutatis mutandis.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method for delivery of liquid additives including a colorant during plastics processing wherein said method comprises:
   establishing a network of components in a control loop, wherein said control loop uses a feedback method to drive at least one pump, said feedback method comprising:
   sending at least one signal from at least one sensor on a plastics processing device to a controller;

sending one or more signals from said controller to said at least one pump;

monitoring the pressure in the at least one pump and sensing the position of an injection nozzle valve; and sending one or more signals to said injection nozzle valve instructing said valve to open or close.

2. A method according to claim 1, wherein said plastics processing comprises a plastics melting process.

3. A method according to claim 1, wherein said additive is delivered downstream of a polymerization reactor in which the plastics material is produced into molten plastics material which has left the reactor and which remains molten after leaving the rector at least until delivery of additive thereinto.

4. The method according to claim 1, wherein said controller is a nozzle controller.

5. The method according to claim 4, wherein said nozzle controller signals said injection nozzle valve to open once the system pressure reaches a user-designated level and said valve is in proper position.

6. The method according to claim 4, wherein said nozzle controller regulates the flow rate of the additive through the nozzle valve to match that of the output of an associated extruder.

7. The method according to claim 1, wherein said at least one or more pumps include a high pressure dosing pump capable of withstanding a pressure of 3000 psi.

8. The method according to claim 7, wherein said at least one or more pumps include a pre-charge pump controller connected in series to said high pressure dosing pump.

9. The method according to claim 8, wherein said pre-charge pump is used in addition to said high pressure pump when pressure is greater than 3000 psi.

10. The method according to claim 9, wherein said pre-charge pump and high pressure pump collectively have the capacity of enduring pressure of at least 6000 psi.

11. The method according to claim 1, wherein input signals include one or more of at least one enablement signal to authorize action; at least one power indication signal; at least one signal indicating an extruder screw is turning; at least one signal indicating at least one of clearing and anti-clog strokes; and at least one amperage signal indicating flow rate.

12. The method according to claim 4, wherein said nozzle controller controls a nozzle which generates 8000-12000 psi of pressure.

13. The method according to claim 4, wherein said nozzle controller controls a nozzle which is a non-valved injection nozzle.

14. The method according to claim 4, wherein said nozzle controller controls a nozzle comprising tubing which is 4000 to 7000 psi tubing.

15. The method according to claim 4, wherein said nozzle controller ensures that pressure of a liquid additive being delivered is higher than the pressure of the melt before it will instruct the valve to open.

16. The method according to claim 4, wherein said nozzle controller ensures that the output of said at least one pump equals the output of an extruder of said plastics processing device.

17. The method according to claim 1, wherein said controller is a nozzle controller; wherein said plastics processing device is an extruder; and wherein sensors on the extruder provide feedback to said nozzle controller.

18. The method according to claim 1, wherein said injection nozzle is adapted for additive delivery downstream on an extruder barrel of said plastics processing device.

19. A method for delivery of liquid additives including a colorant into plastics during plastics processing wherein said method comprises:

establishing a network of components in a control loop, wherein said control loop uses a feedback method to drive at least one pump which is a dosing pump for dosing liquid additives into a plastics melting machine, said feedback method comprising:

sending at least one signal from at least one sensor on said plastics melting machine to a controller;

sending one or more signals from said controller to said at least one dosing pump;

monitoring the pressure in the at least one dosing pump and sensing the position of an injection nozzle valve through which said pump is arranged to pump said liquid additives into said plastics processing machine; and sending one or more signals to said injection nozzle valve instructing said valve to open or close.

20. The method according to claim 1, wherein if the pressure in a nozzle which incorporates said injection nozzle valve reaches a designated warning level, a controller induces a clearing stroke to relieve a clog in the nozzle valve.

* * * * *